United States Patent
Don et al.

(10) Patent No.: US 12,373,334 B1
(45) Date of Patent: Jul. 29, 2025

(54) ENHANCING ARRAY PREFETCH FOR SEQUENTIAL IOs IN ACTIVE-ACTIVE REMOTE REPLICATION

(71) Applicant: Dell Products L.P., Hopkinton, MA (US)

(72) Inventors: Arieh Don, Newton, MA (US); G Vinay Rao, Bangalore (IN); Sanjib Mallick, Krisnarajapuram (IN); Ramesh Doddaiah, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 1 day.

(21) Appl. No.: 18/644,181

(22) Filed: Apr. 24, 2024

(51) Int. Cl.
*G06F 12/00* (2006.01)
*G06F 12/02* (2006.01)

(52) U.S. Cl.
CPC .... *G06F 12/0223* (2013.01); *G06F 2212/251* (2013.01)

(58) Field of Classification Search
CPC ............... G06F 12/0223; G06F 2212/251
See application file for complete search history.

(56) References Cited

U.S. PATENT DOCUMENTS

| | | | | |
|---|---|---|---|---|
| 10,552,050 | B1* | 2/2020 | Verdan | G06F 3/0659 |
| 2017/0235646 | A1* | 8/2017 | Bhagat | G06F 11/1446 |
| | | | | 711/138 |

FOREIGN PATENT DOCUMENTS

| | | | | |
|---|---|---|---|---|
| CN | 103856364 A | * | 6/2014 | G06F 13/385 |
| CN | 105701041 A | * | 6/2016 | G06F 13/161 |
| CN | 106229010 A | * | 12/2016 | G11C 29/26 |
| JP | 3686562 B2 | * | 8/2005 | |
| JP | 3730385 B2 | * | 1/2006 | H03M 7/3086 |

* cited by examiner

*Primary Examiner* — Tim T Vo
*Assistant Examiner* — Mohammad S Hasan
(74) *Attorney, Agent, or Firm* — Anderson Gorecki LLP

(57) ABSTRACT

In an active-active replication environment in which sequential read IOs are distributed across storage array ports and replicas, a first read data size controls selection of a different path to a currently targeted replica to distribute sequential reads across storage system ports and a second read data size controls when a different replica is selected to distribute the sequential reads across storage systems. The storage arrays that maintain the replicas are phase-coordinated to pre-fetch only sequential data that will be accessed in the near future from their local replica. For example, a first storage array prefetches sequential data from a first replica in chunks corresponding to the first data size until sequential data corresponding to the second data size has been prefetched, skips sequential addresses corresponding to the second data size, and prefetches sequential data corresponding to the first data size that is next in sequence relative to the skipped sequential addresses.

20 Claims, 4 Drawing Sheets

ENHANCING ARRAY PREFETCH FOR SEQUENTIAL IOs IN ACTIVE-ACTIVE REMOTE REPLICATION

TECHNICAL FIELD

The subject matter of this disclosure is generally related to electronic data storage systems.

BACKGROUND

Organization level data storage systems maintain storage objects that can be accessed by instances of host applications running on clusters of host servers. Examples of such data storage systems include storage area networks (SANs) with storage arrays, network-attached storage (NAS), and software-defined direct-attached storage (DAS). Examples of the host applications include software and databases for email, e-business, accounting, inventory control, manufacturing control, engineering, and a variety of other business processes. The performance of a storage system can be characterized by the time required to process input-output (IO) commands from host applications running on the host servers to access the storage objects, e.g., to read host application data. In the case of a read IO, data access latency is lower if the required data is already in volatile memory when the IO is received because disk drive access latency is higher than random access memory (RAM) access latency. Data prefetch algorithms copy data from persistent storage into volatile memory in anticipation of near-future use to service IOs.

SUMMARY

In accordance with some implementations a method comprises: configuring a path selector running on a host with a first read data size at which a different path to a currently targeted replica is selected to distribute sequential reads across storage system ports; configuring the path selector with a second read data size at which a different replica is selected to distribute the sequential reads across storage systems, where a first storage system maintains a first replica of a storage object that is a target of the reads, and a second storage system maintains a second replica of the storage object that is the target of the reads; the first storage system prefetching sequential data from the first replica in chunks corresponding to the first data size until sequential data corresponding to the second data size has been prefetched, skipping sequential addresses corresponding to the second data size, and prefetching sequential data corresponding to the first data size that is next in sequence relative to the skipped sequential addresses.

In accordance with some implementations an apparatus comprises: a host server with a path selector configured to select a different path to a currently targeted replica at a first read data size to distribute sequential reads across storage system ports and to select a different replica at a second read data size to distribute the sequential reads across storage systems; a first storage system that maintains a first replica of a storage object that is a target of the reads; a second storage system that maintains a second replica of the storage object that is the target of the reads; and the first storage system configured to prefetch sequential data from the first replica in chunks corresponding to the first data size until sequential data corresponding to the second data size has been prefetched, skip sequential addresses corresponding to the second data size, and prefetch sequential data corresponding to the first data size that is next in sequence relative to the skipped sequential addresses.

A non-transitory computer-readable storage medium in accordance with some implementations stores instructions that are executed by a storage system to perform a method comprising: configuring a path selector running on a host with a first read data size at which a different path to a currently targeted replica is selected to distribute sequential reads across storage system ports; configuring the path selector with a second read data size at which a different replica is selected to distribute the sequential reads across storage systems, where a first storage system maintains a first replica of a storage object that is a target of the reads, and a second storage system maintains a second replica of the storage object that is the target of the reads; the first storage system prefetching sequential data from the first replica in chunks corresponding to the first data size until sequential data corresponding to the second data size has been prefetched, skipping sequential addresses corresponding to the second data size, and prefetching sequential data corresponding to the first data size that is next in sequence relative to the skipped sequential addresses.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
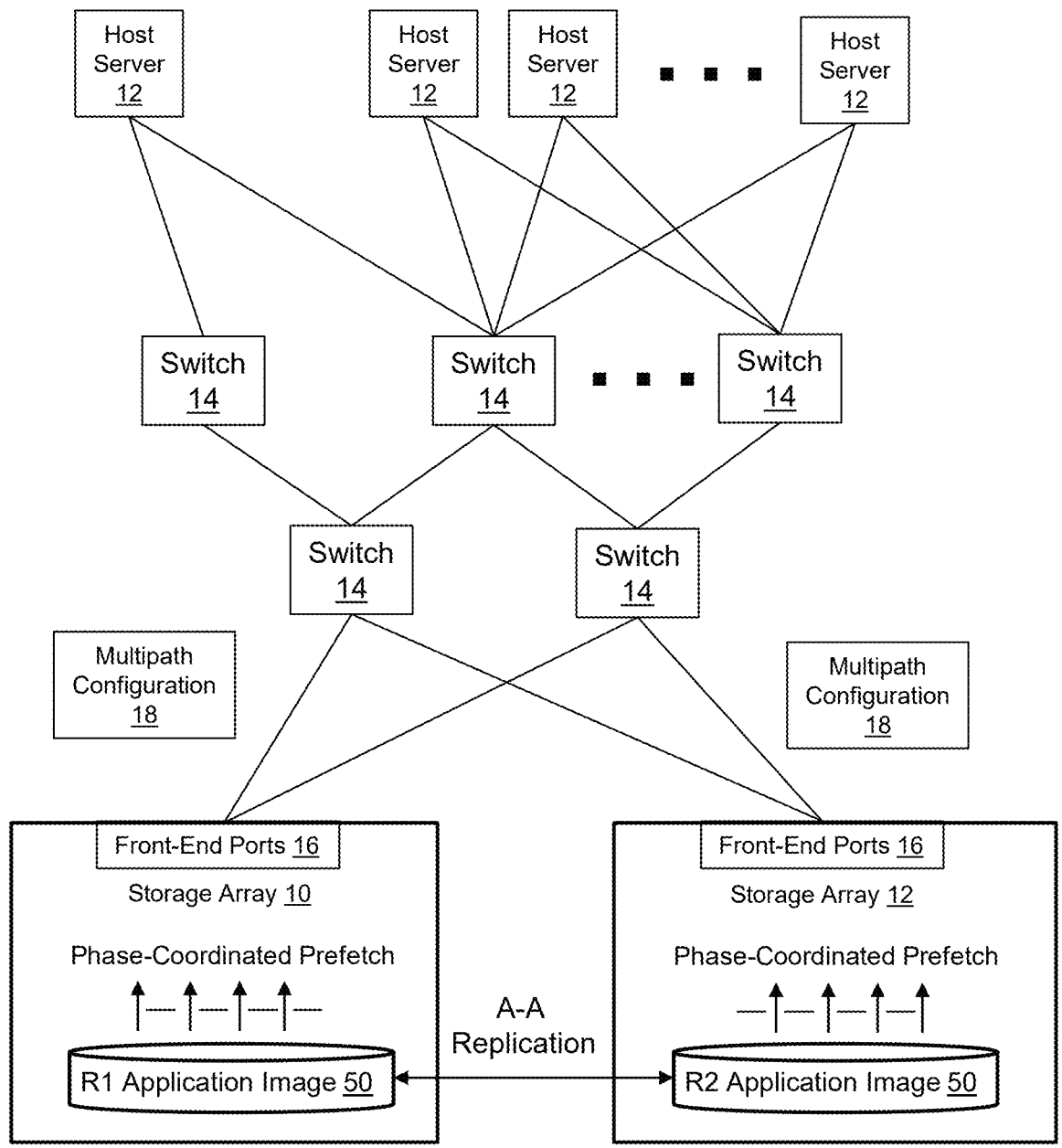
FIG. 1 illustrates phase-coordinated pre-fetch in a data center in which host servers access active-active replicated application images.

FIG. 1 illustrates phase-coordinated pre-fetch in a data center in which host servers access active-active replicated application images. An application image 50 may include all data used by all instances of a particular host application running on a cluster of host servers 12. The application image includes one or more storage objects that are logical disk drives with contiguous logical block addresses (LBAs) at which data can be stored and accessed. The application image 50 is maintained as replica R1 on storage array 10 and replica R2 on storage array 12. The replication is active-active, meaning that both replicas can be simultaneously accessed by the host application instances. The replication is synchronous, meaning that host application writes are contemporaneously written to both replicas in real time. Write acknowledgments are not sent to the host servers until the data is stored in cache on both storage arrays. The host servers 12 communicate with the storage arrays 10, 12 to read from the application image and write data to the application image via a network of switches 14. The application image is accessible to the host servers via some or all of the front-end ports 16 of the storage arrays 10, 12. The host servers distribute IOs across the front-end ports 16 of the storage arrays and also across the replicas R1, R2.

The storage arrays are configured to pre-fetch data from their local replica in anticipation of near-future receipt of IOs to access that data. More specifically, the storage arrays recognize read IOs (RDs) to sequential LBAs and prefetch data based on both contiguity with those sequential LBAs and the distribution of IOs between storage arrays. Standard sequential LBA pre-fetch algorithms do not function properly in an active-active replication environment because they tend to pre-fetch sequential data from R1 that will be accessed from R2, and vice versa. Because host servers distribute IOs across the storage arrays by accessing R1 and R2 in alternating phases, the storage arrays are phase-coordinated to pre-fetch only sequential data that will be accessed in the near future from their local replica. The host servers 12 provide multipath configuration information 18 to the storage arrays to enable calculation of the pre-fetch data size and phase intervals.

Figure 2:
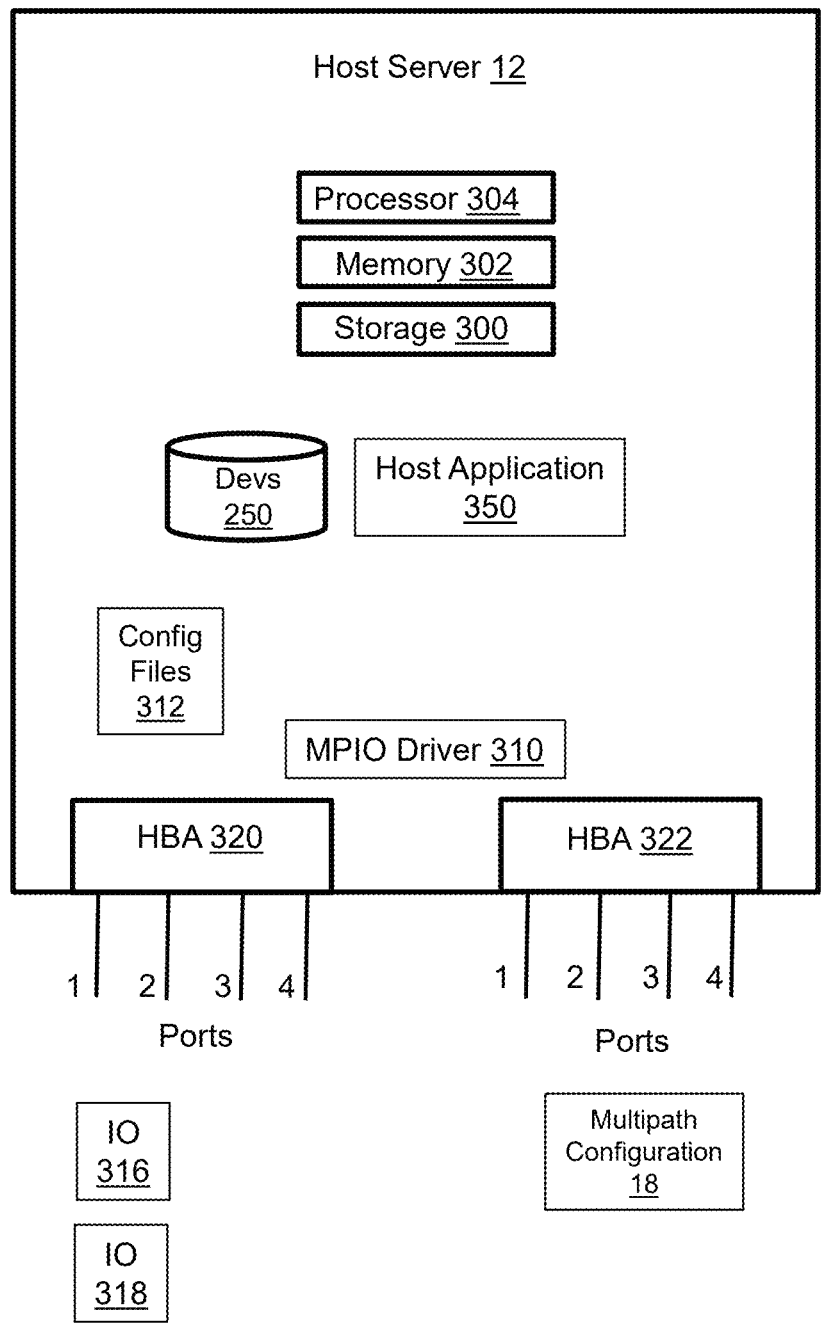
FIG. 2 illustrates a host server in greater detail.

FIG. 2 illustrates a host server 12 in greater detail. Each host server includes volatile memory 302, non-volatile storage 300, one or more tangible processors 304 that support instances of at least one host application 350, a Multi-Path Input-Output (MPIO) driver 310 running in the host kernel, and a plurality of host bus adapter (HBA) 320 Network Interface Cards (NICs), each with multiple ports 1-4. Examples of host applications might include, but are not limited to, databases and software for email, accounting, sales, inventory control, manufacturing, and a wide variety of other organizational functions.

The MPIO driver 310 discovers storage objects associated with the application images that are maintained and presented on separate sets of ports by the storage array. Logical host devices 250 are host server-local representations of the storage objects of application image 50 (FIG. 1). The instances of the host application use the logical host devices for data access, e.g., to read and write host application data to logical block addresses (LBAs). Corresponding IOs 316, 318 are generated and sent to the storage array via the MPIO driver and HBA ports to access the application image storage objects to read and write data. More specifically, the MPIO driver selects from among multiple port-defined paths that are available to access the application image in order to balance IO loading across the paths via which the application image is accessible. Each IO is sent to the storage array via the host server and storage array ports corresponding to the selected path. Configuration files 312 maintained by the host server include metadata that describes the paths supported by the host server. For example, the port IDs and authentication credentials for each supported path are included in the configuration files, which may be persistently stored in storage and copied into memory for low latency access during operation.

The MPIO driver 310 is configured to recognize streaming sequential IOs from the host application 350. The MPIO driver is configured to distribute those sequential IOs among available paths in sets of X IOs, where X is a predetermined, user-configurable number. After X IOs have been sent to the currently selected path, the MPIO driver will select a different path for the next X IOs in accordance with a distribution policy. Some distribution policies specify that the next path is selected in a round-robin manner. Other distribution policies specify selection of the next path is based on path loading. The MPIO driver is further configured to distribute the sequential IOs among available replicas in sets of Y IOs, where Y is a predetermined, user-configurable number. After Y IOs have been sent to the currently selected replica, likely via multiple paths, the MPIO driver will select a different replica for the next Y IOs in accordance with the distribution policy. The values of X and Y are indicated in multipath configuration message 18, which is sent to the storage arrays, e.g., using SCSI protocol communications.

Figure 3:
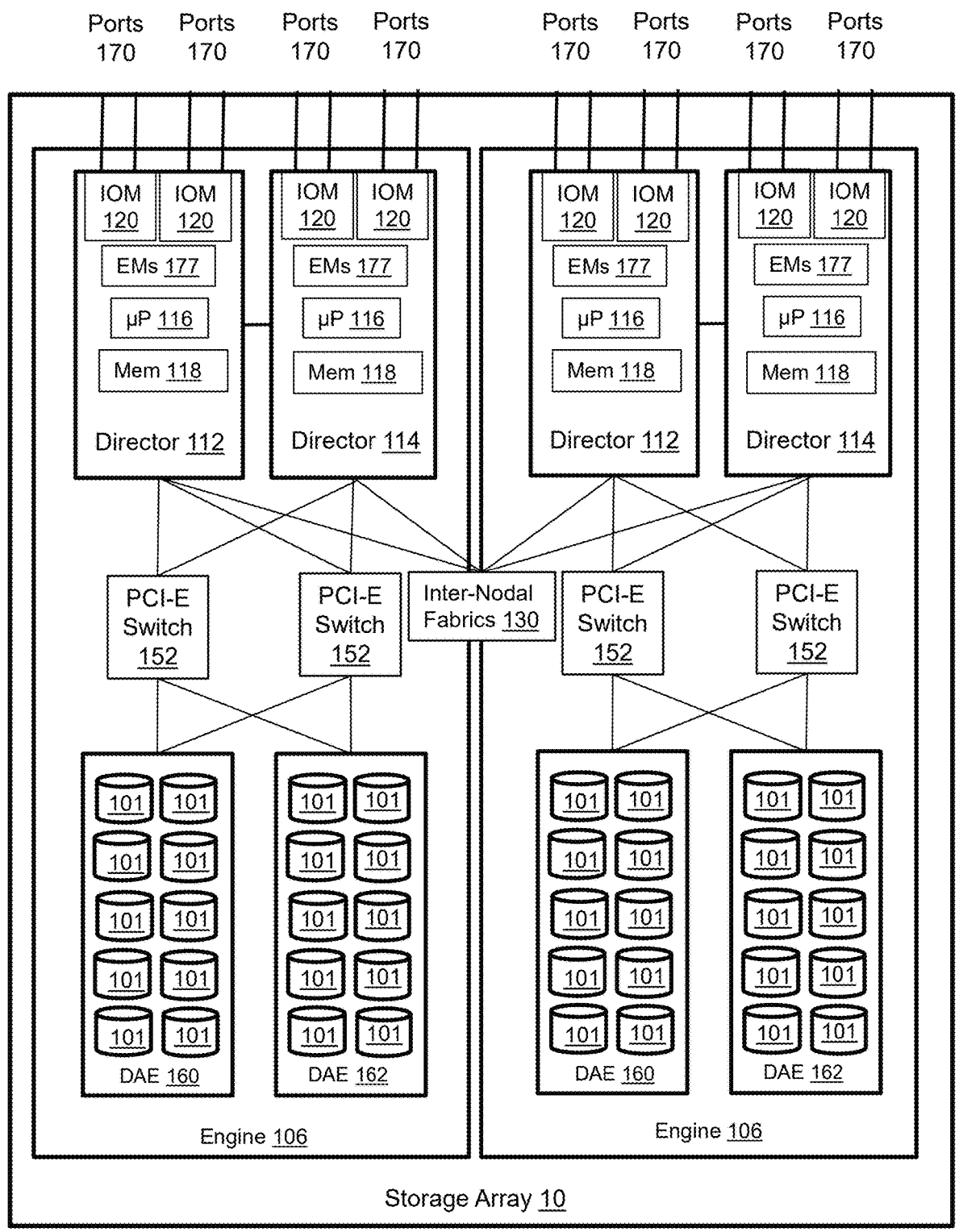
FIG. 3 illustrates a storage array in greater detail.

FIG. 3 illustrates storage array 10 in greater detail. The storage arrays 10, 12 (FIG. 1) may be substantially similar. The illustrated storage array includes two engines 106, although there may be any number of engines. Each engine includes disk array enclosures (DAEs) 160, 162 and a pair of specialized, peripheral component interconnect express (PCI-E) interconnected compute nodes known as storage directors 112, 114 that are in a failover relationship. Within each engine, the storage directors and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each storage director is implemented on a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each storage director allocates a portion of its local memory 118 to a shared memory that can be accessed by all storage directors of the storage array. Each storage director includes one or more IO modules (IOMs) 120 with front-end ports 170 for communicating with host servers. Each storage director also includes one or more adapters for communicating with other storage directors via point-to-point links or redundant inter-nodal channel-based InfiniBand fabrics 130.

Each storage director 112, 114 runs emulations (EMs 177) that perform different storage-related tasks and functions. Front-end emulations handle communications with the host servers. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. One or more of the emulations may be configured to implement phase-coordinated prefetch.

The managed drives 101 are not discoverable by the host servers, so the storage array creates logical production storage objects that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers, each production storage object is a single disk drive having a set of contiguous fixed-size LBAs on which data used by the instances of one of the host applications resides. However, the host application data is stored at non-contiguous addresses distributed across multiple managed drives 101. The emulations maintain metadata that maps between the LBAs of the production storage objects and physical addresses on the managed drives in order to process IOs from the host servers. The basic allocation unit of storage capacity that is used by the storage directors 112, 114 to access the managed drives 101 is a back-end track (BE TRK). The managed drives are organized into same-size splits, each of which may contain multiple BE TRKs. A grouping of splits from different managed drives 101 is used to create a RAID protection group with each split containing a protection group member. A storage resource pool is a type of storage object that includes a collection of protection groups of the same RAID level, e.g., RAID-5 (3+1), on thinly provisioned logical data devices (TDATs) that are used to create the production storage objects. The host application data is logically stored in front-end tracks (FE TRKs) on the production storage objects. The FE TRKs of the production storage objects are mapped to the BE TRKs on the managed drives and vice versa by tables and pointers that are maintained in the shared memory. A collection of production storage objects associated with a single host application is known as a storage group or application image. Multiple instances of a single host application may use the same storage group, but instances of different host applications do not use the same storage group. The storage array may maintain any number of storage groups, e.g., one per supported host application.

In order to process a RD, an emulation uses information in the IO to identify a metadata page corresponding to a FE-TRK, such as by inputting the storage object ID and LBAs into a hash table. The hash table indicates the location of the corresponding metadata page in metadata slots in the shared memory. A BE-TRK ID pointer from that metadata page is obtained and used to find the corresponding BE-TRK data associated with the FE-TRK. The situation in which the corresponding BE-TRK is already present in the shared memory when the RD IO is received is known as a "cache hit." IO response time latency in the case of a cache hit tends to be low because the volatile memory 118 has lower access latency than the managed drives 101 and can be quickly accessed by the data services emulations running on the CPU complexes. However, cache hits do not happen for every RD IO. If the corresponding BE-TRK is not present in the shared memory when the RD IO is received, a situation known as a "cache miss," then the data services and back-end emulations locate and retrieve a copy of BE-TRK from the managed drives into shared memory. The copy in memory is then used to respond to the host server. Background processes recycle the least recently accessed data slots by flushing or evicting the data depending on whether it is flagged as write-pending. The amount of time that data resides in shared memory before being flushed or evicted is referred to as fall-through time (FTT). Performance can be adversely affected by pre-fetching data that is not accessed before being flushed or evicted.

Figure 4:
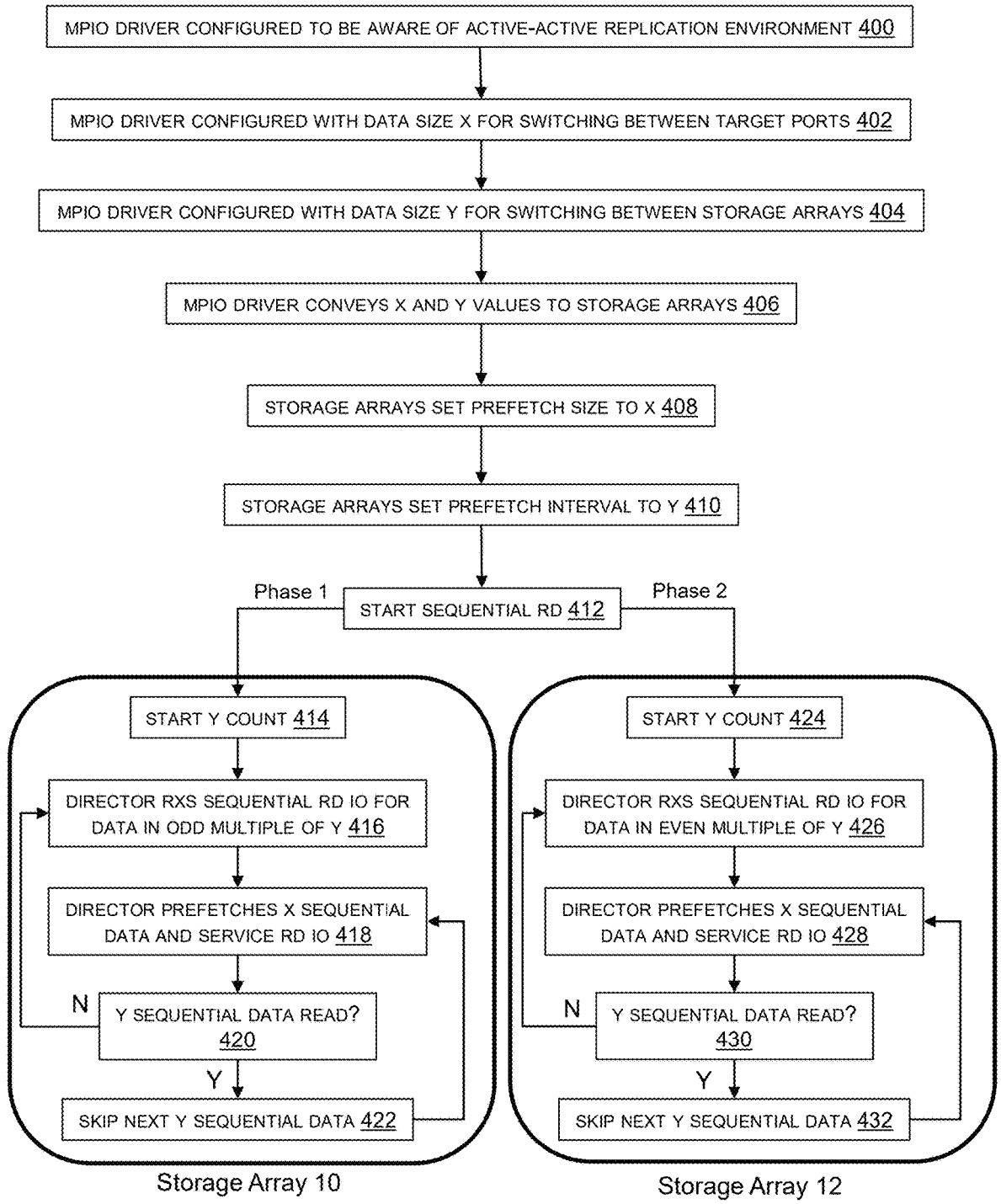
FIG. 4 illustrates a method for phase-coordinated prefetch.

FIG. 4 illustrates a method for phase-coordinated prefetch. The method may be implemented by the MPIO drivers and storage array emulations, for example, and without limitation. The steps will be described with respect to a single host server but could be implemented for each host server. Further, the steps could be implemented on a per application image or per storage object basis. Step 400 is configuring the host server MPIO driver with awareness of the active-active replication environment. For example, the MPIO driver may be provided with a path mapping that indicates which replica and/or storage array is associated with each available path to access a particular storage object or application image. Step 402 is configuring the MPIO driver with the data size X at which a different target port path is selected. Step 404 is configuring the MPIO driver with the data size Y at which a different replica/storage array target path is selected. The term "data size" is used rather than RD command count because sequential RD streams may use different RD sizes, e.g., 4K, 8K, and so forth. Data size can be derived from the product of the RD count and RD size. In step 406 the MPIO driver sends a message to the storage arrays to convey the values of X and Y. In step 408 the storage arrays set their prefetch size to X. In step 410 the storage arrays set their prefetch phase interval to Y.

A sequential RD starts in step 412. The MPIO driver recognizes that the IOs are to access sequential LBAs and performs port and replica-based distribution of the sequential IOs. More specifically, the MPIO driver switches sending of IOs between ports of a single storage array/replica each time the sequential IOs in aggregate reach data size X and switches sending of IOs between storage arrays/replicas each time the sequential IOs in aggregate reach data size Y. Switching between storage arrays/replicas thus occurs in phases characterized by multiples of data size Y, with IOs of odd-numbered phases sent to storage array 10 and IOs of even-numbered phases sent to storage array 12. Starting in phase 1, storage array 10 recognizes the sequential RDs and starts a count to data size Y in step 414 following receipt of the first IO of the phase. In step 416 one of the storage directors receives the sequential RD IO for host application data. In step 418 the IO-receiving storage director prefetches X data that is next in sequence relative to the RD IO data and services the RD IO. If Y sequential data has not been read as determined in step 420, then flow returns to step 416. The IO-receiving storage director that performs the prefetch in step 418 will not necessarily include the IOM port via which all the sequential RD IOs are received, but the prefetched data will be in shared memory of the storage array so the result is still considered a cache hit. Steps 416 through 420 are iterated until Y sequential data has been read as determined in step 420. In step 422 storage array 10 skips prefetching the next Y sequential data and prefetches X data that is next in sequence relative to the last RD IO data plus the Y sequential data that was skipped.

The Y sequential data that was skipped by storage array 10 is accessed from storage array 12 in phase 2. Storage array 12 recognizes the first sequential RD of the phase and starts a count to data size Y in step 424. In step 426 a storage director receives the sequential RD IO for host application data. In step 428 the IO-receiving storage director prefetches X data that is next in sequence relative to the RD IO data and services the RD IO. If Y sequential data has not been read as determined in step 430, then flow returns to step 426. Steps 426 through 430 are iterated until Y sequential data has been read as determined in step 430. In step 432 storage array 12 skips prefetching the next Y sequential data and prefetches X data that is next in sequence relative to the last RD IO data plus the Y sequential data that was skipped. The Y sequential data that was skipped by storage array 12 is accessed from storage array 10 in phase 3.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    configuring a path selector running on a host with a first read data size at which a different path to a currently targeted replica is selected to distribute sequential reads across storage system ports;
    configuring the path selector with a second read data size at which a different replica is selected to distribute the sequential reads across storage systems, where a first storage system maintains a first replica of a storage object that is a target of the reads, and a second storage system maintains a second replica of the storage object that is the target of the reads;
    the first storage system prefetching sequential data from the first replica in chunks corresponding to the first data size until sequential data corresponding to the second data size has been prefetched, skipping sequential addresses corresponding to the second data size, and prefetching sequential data corresponding to the first data size that is next in sequence relative to the skipped sequential addresses.

2. The method of claim 1 further comprising the second storage system prefetching sequential data that was skipped by the first storage system from the second replica in chunks corresponding to the first data size.

3. The method of claim 2 further comprising the second storage system prefetching the sequential data from the second replica that is next in sequence relative to the sequential addresses prefetched from the first replica until sequential data corresponding to the second data size has been prefetched, skipping sequential addresses corresponding to the second data size, and prefetching sequential data corresponding to the first data size that is next in sequence relative to the skipped sequential addresses.

4. The method of claim 3 further comprising the path selector signaling the first data size and the second data size to the first storage system and the second storage system.

5. The method of claim 4 further comprising setting a sequential data prefetch size to the first data size responsive to the signaling.

6. The method of claim 5 further comprising setting a sequential data prefetch interval size to the second data size responsive to the signaling.

7. The method of claim 6 further comprising, in alternating prefetch intervals, prefetching sequential data corresponding to the data prefetch size by IO-receiving storage directors responsive to receipt of a sequential read.

8. An apparatus comprising:
    a host server with a path selector configured to select a different path to a currently targeted replica at a first read data size to distribute sequential reads across storage system ports and to select a different replica at a second read data size to distribute the sequential reads across storage systems;
    a first storage system that maintains a first replica of a storage object that is a target of the reads;
    a second storage system that maintains a second replica of the storage object that is the target of the reads; and
    the first storage system configured to prefetch sequential data from the first replica in chunks corresponding to the first data size until sequential data corresponding to the second data size has been prefetched, skip sequential addresses corresponding to the second data size, and prefetch sequential data corresponding to the first data size that is next in sequence relative to the skipped sequential addresses.

9. The apparatus of claim 8 further comprising the second storage system configured to prefetch sequential data that was skipped by the first storage system from the second replica in chunks corresponding to the first data size.

10. The apparatus of claim 9 further comprising the second storage system configured to prefetch the sequential data from the second replica that is next in sequence relative to the sequential addresses prefetched from the first replica until sequential data corresponding to the second data size has been prefetched, skip sequential addresses corresponding to the second data size, and prefetch sequential data corresponding to the first data size that is next in sequence relative to the skipped sequential addresses.

11. The apparatus of claim 10 further comprising the path selector configured to signal the first data size and the second data size to the first storage system and the second storage system.

12. The apparatus of claim 11 further comprising the first storage system and the second storage system configured to set a sequential data prefetch size to the first data size responsive to the path selector signal.

13. The apparatus of claim 12 further comprising the first storage system and the second storage system configured to set a sequential data prefetch interval size to the second data size responsive to the path selector signal.

14. The apparatus of claim 13 further comprising the first storage system and the second storage system configured to prefetch, in alternating prefetch intervals, sequential data corresponding to the data prefetch size by IO-receiving storage directors responsive to receipt of a sequential read.

15. A non-transitory computer-readable storage medium that stores instructions that are executed by a computer to perform a method comprising:
    configuring a path selector running on a host with a first read data size at which a different path to a currently targeted replica is selected to distribute sequential reads across storage system ports;

configuring the path selector with a second read data size at which a different replica is selected to distribute the sequential reads across storage systems, where a first storage system maintains a first replica of a storage object that is a target of the reads, and a second storage system maintains a second replica of the storage object that is the target of the reads;

the first storage system prefetching sequential data from the first replica in chunks corresponding to the first data size until sequential data corresponding to the second data size has been prefetched, skipping sequential addresses corresponding to the second data size, and prefetching sequential data corresponding to the first data size that is next in sequence relative to the skipped sequential addresses.

16. The non-transitory computer-readable storage medium of claim 15 in which the method further comprises the second storage system prefetching sequential data that was skipped by the first storage system from the second replica in chunks corresponding to the first data size.

17. The non-transitory computer-readable storage medium of claim 16 in which the method further comprises the second storage system prefetching the sequential data from the second replica that is next in sequence relative to the sequential addresses prefetched from the first replica until sequential data corresponding to the second data size has been prefetched, skipping sequential addresses corresponding to the second data size, and prefetching sequential data corresponding to the first data size that is next in sequence relative to the skipped sequential addresses.

18. The non-transitory computer-readable storage medium of claim 17 in which the method further comprises the path selector signaling the first data size and the second data size to the first storage system and the second storage system.

19. The non-transitory computer-readable storage medium of claim 18 in which the method further comprises setting a sequential data prefetch size to the first data size responsive to the signaling.

20. The non-transitory computer-readable storage medium of claim 19 in which the method further comprises setting a sequential data prefetch interval size to the second data size responsive to the signaling and, in alternating prefetch intervals, prefetching sequential data corresponding to the data prefetch size by IO-receiving storage directors responsive to receipt of a sequential read.

* * * * *